United States Patent [19]

Pospischil

[11] Patent Number: 4,975,908

[45] Date of Patent: Dec. 4, 1990

[54] BASIC PULSE FRAME AND METHOD FOR A DIGITAL SIGNAL MULTIPLEX HIERARCHY

[75] Inventor: Reginhard Pospischil, Lochham, Fed. Rep. of Germany

[73] Assignee: Siemens Aktiengesellschaft, Berlin and Munich, Fed. Rep. of Germany

[21] Appl. No.: 281,287

[22] Filed: Dec. 8, 1988

[30] Foreign Application Priority Data

Dec. 15, 1987 [DE] Fed. Rep. of Germany ....... 3742505
Jan. 20, 1988 [DE] Fed. Rep. of Germany ....... 3801552

[51] Int. Cl.[5] .......................... H04J 3/24; H04J 3/06; H04J 3/12
[52] U.S. Cl. ............................... 370/94.1; 370/100.1; 370/110.1
[58] Field of Search ..................... 370/100, 94.1, 94.2, 370/109, 60, 60.1, 84, 112, 100.1, 79, 110.1, 99

[56] References Cited

U.S. PATENT DOCUMENTS

| | | | |
|---|---|---|---|
| 3,213,201 | 10/1965 | Flood et al. .......................... | 370/109 |
| 4,646,290 | 2/1987 | Hills ..................................... | 370/84 |
| 4,719,624 | 1/1988 | Bellisio ................................. | 370/112 |
| 4,752,923 | 6/1988 | Allen et al. ........................... | 370/84 |
| 4,761,781 | 8/1988 | Calvignac et al. ................... | 370/94 |

FOREIGN PATENT DOCUMENTS 2125256 2/1984 United Kingdom .

OTHER PUBLICATIONS

TM 45/140 . . . 316 Commutation & Transmission 7, (1985), No. 3, pp. 29–38.
VII Assemblee Pleiniere, Union Internationale des Telecommunications, Nov. 1980, pp. 144–155.
American National Standard, Draft of American National Standard for Telecommunications Optical Interface Rates and Formats, 10/20/87, 102 pages.

*Primary Examiner*—Douglas W. Olms
*Assistant Examiner*—Wellington Chin
*Attorney, Agent, or Firm*—Hill, Van Santen, Steadman & Simpson

[57] ABSTRACT

A basic pulse frame is disclosed that is employable in a synchronous network for digital signals of both the CEPT hierarchy as well as of the US hierarchy while maintaining maximum transmission capacity. The synchronous payload envelope (SPE) of the basic pulse frame is composed of 9 rows (Z) and 264 columns (Sp). A configuration that is optimum for signals of the CEPT hierarchy and a configuration that is optimum for signals of the US hierarchy is achieved, each of which also allow a transmission of sufficient signals of the other type. The configuration for preferably CEPT signals comprises 16 main blocks (HB1a–HB16a) and two auxiliary blocks (ZB1a, ZB2a). Both serve for the optional occupation with auxiliary signals; the second auxiliary block (ZB2a) also additionally serves for optional occupation with useful data signals. 204 bit/kbit/s CEPT signals transmitted in the synchronous payload envelope (SPE1a) can be completely inserted into 34,368 kbit/s signals of the higher CEPT hierarchy level [and] 1544 kbit/s US signals transmitted in the synchronous payload envelope (SPE1a) can be inserted with minimal loss of transmission capacity into 34,368 kbit/s signals of the higher CEPT hierarchy level that can follow a common 139,264 kbit/s hierarchy level. The configuration for preferably US signals contains 21 main blocks and 3 or 4 auxiliary blocks. The basic pulse frame is suitable for a world-wide digital signal multiplex hierarchy for a synchronous network.

24 Claims, 6 Drawing Sheets

BASIC PULSE FRAME AND METHOD FOR A DIGITAL SIGNAL MULTIPLEX HIERARCHY

BACKGROUND OF THE INVENTION

The invention is directed to a basic pulse frame and method for a digital signal multiplex synchronous network, with the basic pulse frame including a head part or header for including transport overhead signals and also including an envelope-structured part or SPE for useful data and auxiliary signals (synchronous payload envelope) having nine rows and multiple columns of cells, each occupied by an oktette or byte coded in octal or hexadecimal.

The CEPT countries and the USA have already made proposals for various basic pulse frames that, in the case of different digital signal multiplex hierarchies, are largely incompatible and respectively met their own interests.

BRIEF DESCRIPTION OF THE INVENTION

It is a principal object of the invention to specify a basic pulse frame in which time-division multiplex signals having both the bit rates of 2048 kbit/s as well as 1544 kbit/s and, insofar as possible, also of 8448 kbit/s and 6312 kbit/s can be transmitted, and in which a combination to form both 34,368 kbit/s signals as well as 44,736 kbit/s signals is possible. The respectively former bit rates are used in the CEPT or European hierarchy, and the latter are used in the North American hierarchy.

A uniform frame that can accept, combine and output signals of both hierarchies that is employable worldwide is created with such a basic pulse frame. Compatibility can be established for the upper hierarchy levels having a bit rate of 139,264 kbit/s or a multiple of this bit rate.

Proceeding on the basis of such a basic pulse frame, this object is inventively achieved for the envelope-structured part in that either 16 main blocks for 16 columns or 12 main blocks for 21 columns and further columns for auxiliary blocks are provided in the envelope-structured part.

Particularly for the CEPT hierarchy, it is advantageous when 261 columns are provided, when 16 main blocks each having 16 columns are provided, when the first main block is preceded by a first auxiliary block having 4 columns for optional occupation with auxiliary signals and when a second auxiliary block having 1 column for optional occupation with auxiliary or useful signals is provided between the eighth and the ninth main blocks.

The same is true of a solution wherein 260 columns are provided, whereby each of the 16 main blocks are provided with 16 columns, whereby the first main block is preceded by a first auxiliary block having 3 columns for optional occupation with auxiliary signals, and whereby a second auxiliary block having 1 column for optional occupation with auxiliary and useful signals is provided between the eighth and the ninth main blocks.

It is also advantageous when the main blocks and the auxiliary blocks together cover 264 columns in the envelope-structured part.

An advantageous development of this latter part, particularly for the CEPT hierarchy, comprises 16 main blocks each having 16 columns with the first main block being preceded by a first auxiliary block having 4 columns for optional occupation with auxiliary signals, and a second auxiliary block having 4 columns for optional occupation with auxiliary or useful signals between the eighth and the ninth main blocks.

By contrast, it is particularly advantageous for the U.S. hierarchy when 12 main blocks each having 21 columns are provided, with the first main block being preceded by a first auxiliary block having 4 columns for optional occupation with auxiliary signals, and a second auxiliary block between the fourth and the fifth main blocks and a third auxiliary block between the eighth and the ninth main blocks, each of these auxiliary blocks comprising 4 columns for optional occupation with auxiliary or useful signals.

The same is true of a solution that has 12 main blocks each having 21 columns, with the first main block being preceded by a first auxiliary block having 3 columns for optional occupation with auxiliary signals, and a second auxiliary block having 3 columns between the third and the fourth main blocks, a third auxiliary block having 3 columns between the sixth and the seventh main blocks and a fourth auxiliary block between the ninth and the tenth main blocks, each of these auxiliary blocks having 3 columns for respectively optional occupation with auxiliary or useful signals.

Further developments of these envelope-structured parts may also be derived.

Four columns offer the structure for a transmission of a 2048 kbit/s signal and 16 columns offer the structure for a transmission of an 8448 kbit/s signal. A 1544 kbit/s signal requires 3 columns and a 6312 kbit/s signal requires 2 columns. In the case of the conditions recited above, the signals transmitted in the envelope-structured part can be combined into four 34,368 kbit/s signals or three 44,736 kbit/s signals that can in turn be inserted into one 139,264 kbit/s signal. All signals can be synchronous or plesiochronic. It is especially advantageous when the column plurality 264 for the CEPT hierarchy is divisible by 4 and is divisible by 3 for the U.S. hierarchy.

Respectively one type of envelope-structured part allows a transmission of signals of the CEPT hierarchy or of the U.S. hierarchy without loss of transmission capacity. However, sufficient signals of the other hierarchy can also be respectively transmitted.

SUMMARY OF THE DRAWINGS

The invention shall be set forth in greater detail below with reference to exemplary embodiments.

DESCRIPTION OF THE PREFERRED EMBODIMENTS

Figure 1:
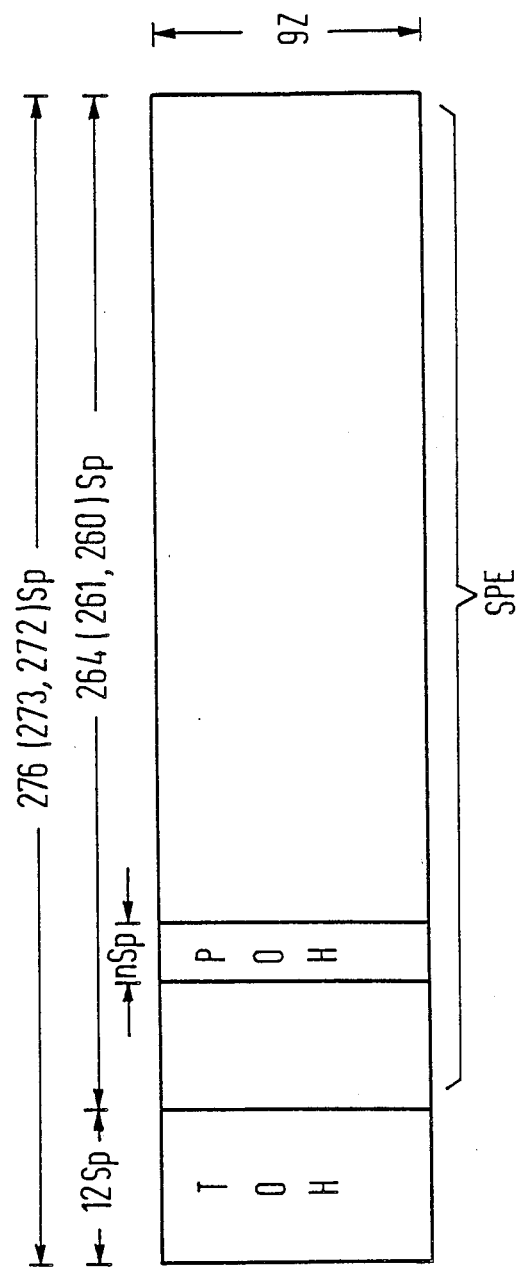
FIG. 1 shows the structure of the basic pulse frame of the invention.

FIG. 1 shows the structure of the inventive basic pulse frame having a length of, in particular, 2484 bytes. For graphic illustration, the basic pulse frame has been divided into nine sections that are arranged above one another as blocks or rows, so that there are 276 columns Sp and 9 rows Z. The first 12 columns form the transport overhead TOH. The remaining 264 columns cover an envelope structured part (synchronous payload envelope) SPE. This can contain only 261 or 260 columns because a path overhead POH, having n columns and which accompanies the useful signals up to de-multiplexing, is also provided within this part SPE.

Figure 2:
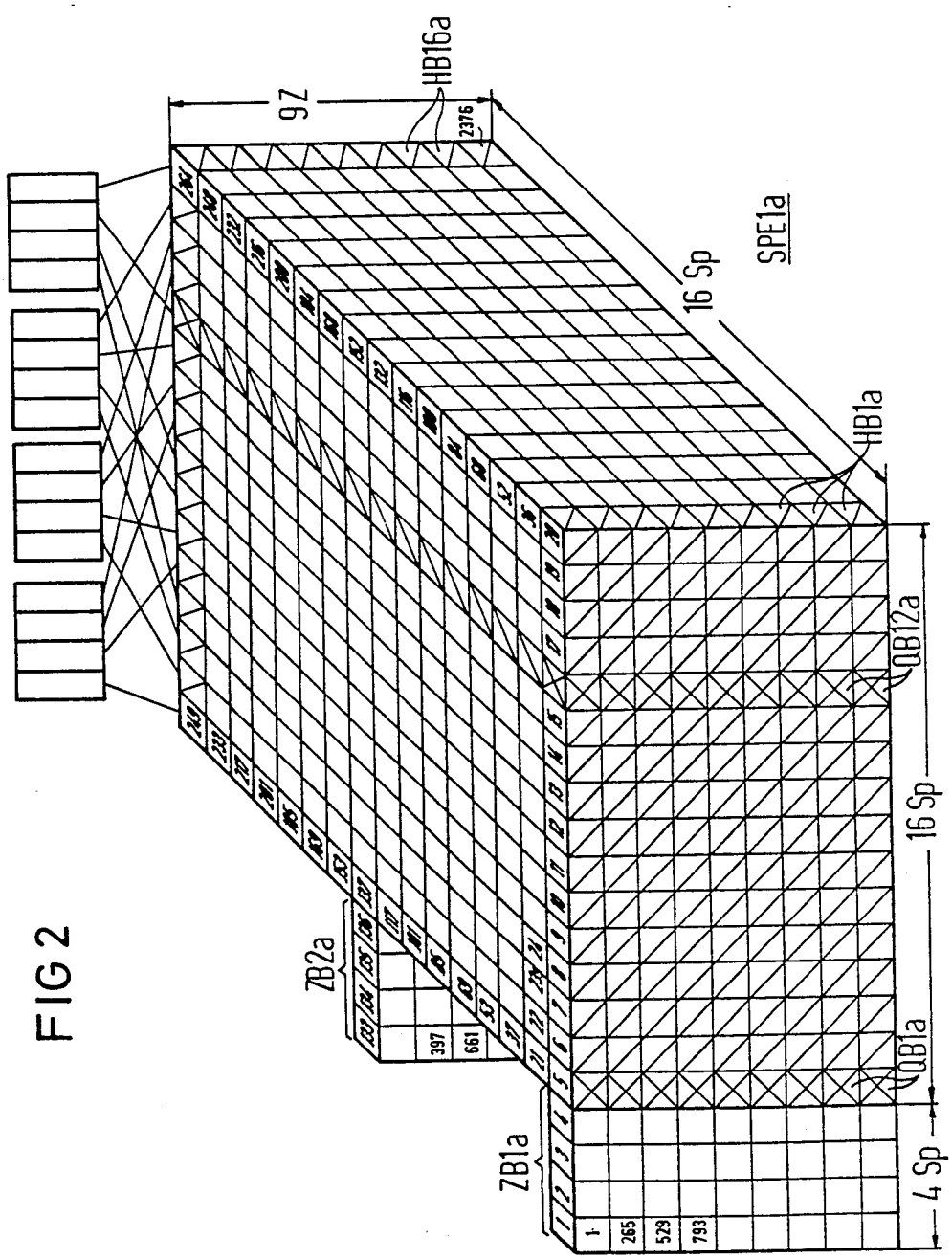
FIG. 2 shows an envelope-structured part, preferably for 204 kbit/s signals.

FIG. 2 shows a synchronous payload envelope SPE1a having 264 columns. In graphic terms, one columns Sp is composed of 9 cubes placed on top of one another each of which contains one byte or, respectively, 1 (octal) oktette, coded in octal or hexadecimal. 16 main blocks HB1a–HB16a are arranged following one another. Auxiliary blocks ZB1a and ZB2a are attached at the left. The bytes are continuously numbered from 1 to 2376. Cubes that, as viewed from the front, carry a stroke from the upper left toward the lower right form main blocks HB1a and HB16a. The remainder of the main blocks HB2a through HB15a lie between those two. Cubes that carry the other diagonal stroke, as viewed from the front form transverse blocks QB1a and QB12a.

The rectangles illustrated at the top of FIG. 2 symbolize 34,368 kbit/s signals, each of which is composed of four 8448 kbit/s signals. The latter can be in turn inserted into one 139,264 kbit/s signal. The lines to the part SPEa show the transverse blocks from which data are taken for the 34,368 kbit/s signals.

Respectively four columns within the main blocks HB1a–HB16a can be provided for the acceptance of a 2048 kbit/s signal, for example the columns 20, 84, 152 and 216 or the columns 5, 69, 127 and 201. for a formation of four 34,368 kbit/s signals, data are taken from the columns 5–20, 69–84, 137–152 and 201–216, from the columns 21–36, 85–100, 153–168 and 217–232, from the columns 37–52, 101–116, 169–184 and 233–248 or, respectively, from the columns 53–68, 117–132, 185–200 and 249–264 of respectively every fourth transverse block. 16 columns offer space for an 8488 kbit/s signal.

However, 1544 kbit/s signals can also be transmitted in respectively three columns without subsequent transposition. to that end, the columns, 5–25, 93–113 and 181–201, the columns 26–46, 114–134 and 202–222, the columns 47–67, 135–155 and 223–243 or, respectively, the columns 68–88, 156–176 and 244–264 can be combined. The columns 1–4, 89–92 and 177–180 serve for the acceptance of auxiliary signals.

For a formation of four 34,368 kbit/s signals, from 1544 kbit/s signals, data can be respectively taken offset from the columns 5–20, 85–100, 169–184, from the columns 21–36, 101–116 and 185–200, from the columns 37–52, 117–132 and 201–216, from the columns 53–68, 137–152 and 217–252 or, respectively, from the columns 69–84, 153–168 and 233–248 of every fourth transverse block. The columns 249–264 are provided for auxiliary signals.

Transverse blocks QB1a through QB16a can be respectively provided for the acceptance of four 2048 kbit/s signals or five 1544 kbit/s signals. The column remaining free in the latter can accept auxiliary signals.

Figure 3:
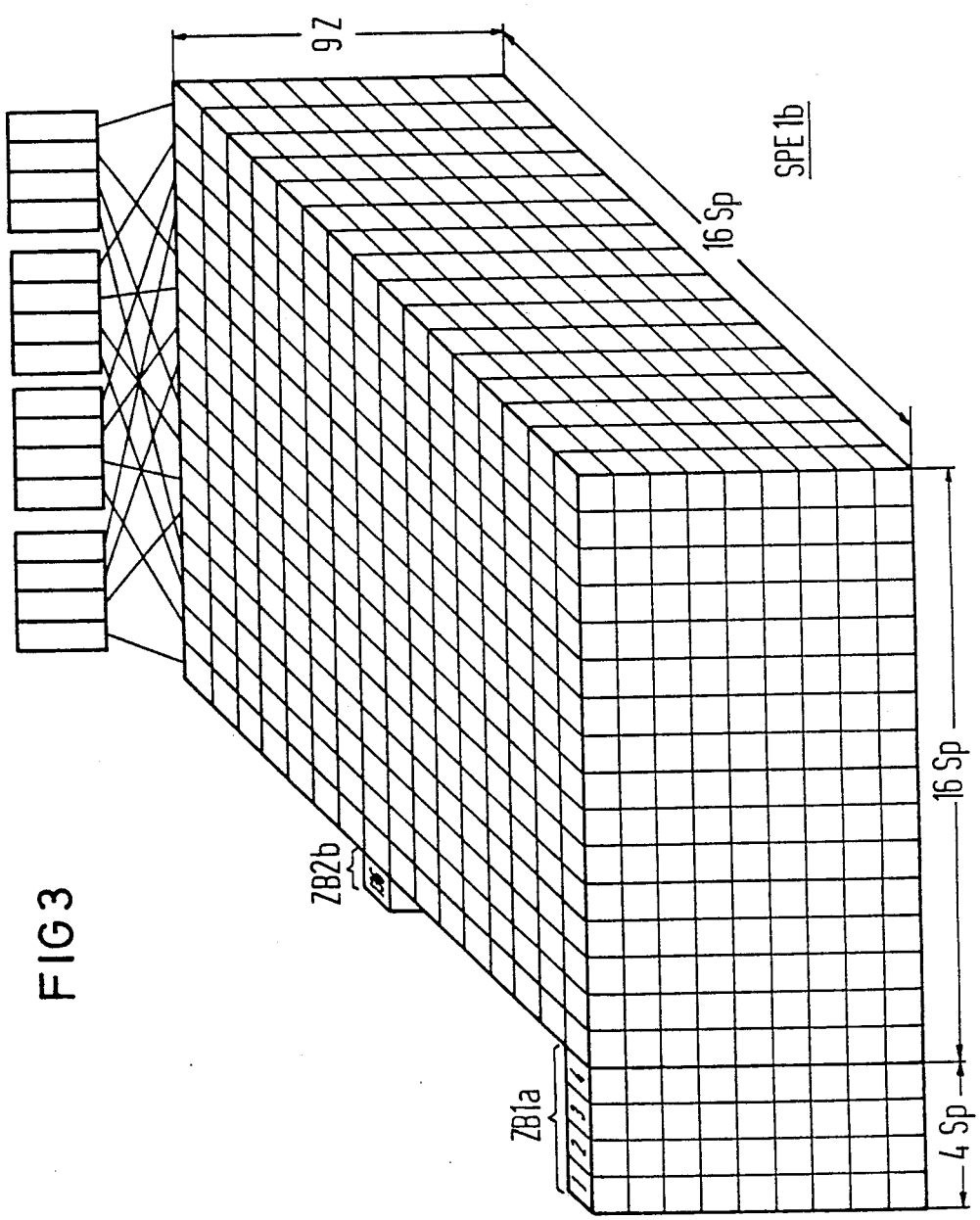
FIG. 3 shows a second variant of this part.

FIG. 3 shows a synchronous payload envelope SPE1b having the known plurality of 261 columns. It differs from that of FIG. 1 only in that the second auxiliary block ZB2b does not contain four columns but only one column and, thus, the columns 133 through 135 are absent.

All occupations previously recited are possible in this synchronous payload envelope SPE1b except that wherein the second auxiliary block ZB2a was occupied with 1544 kbit/s signals.

Figure 4:
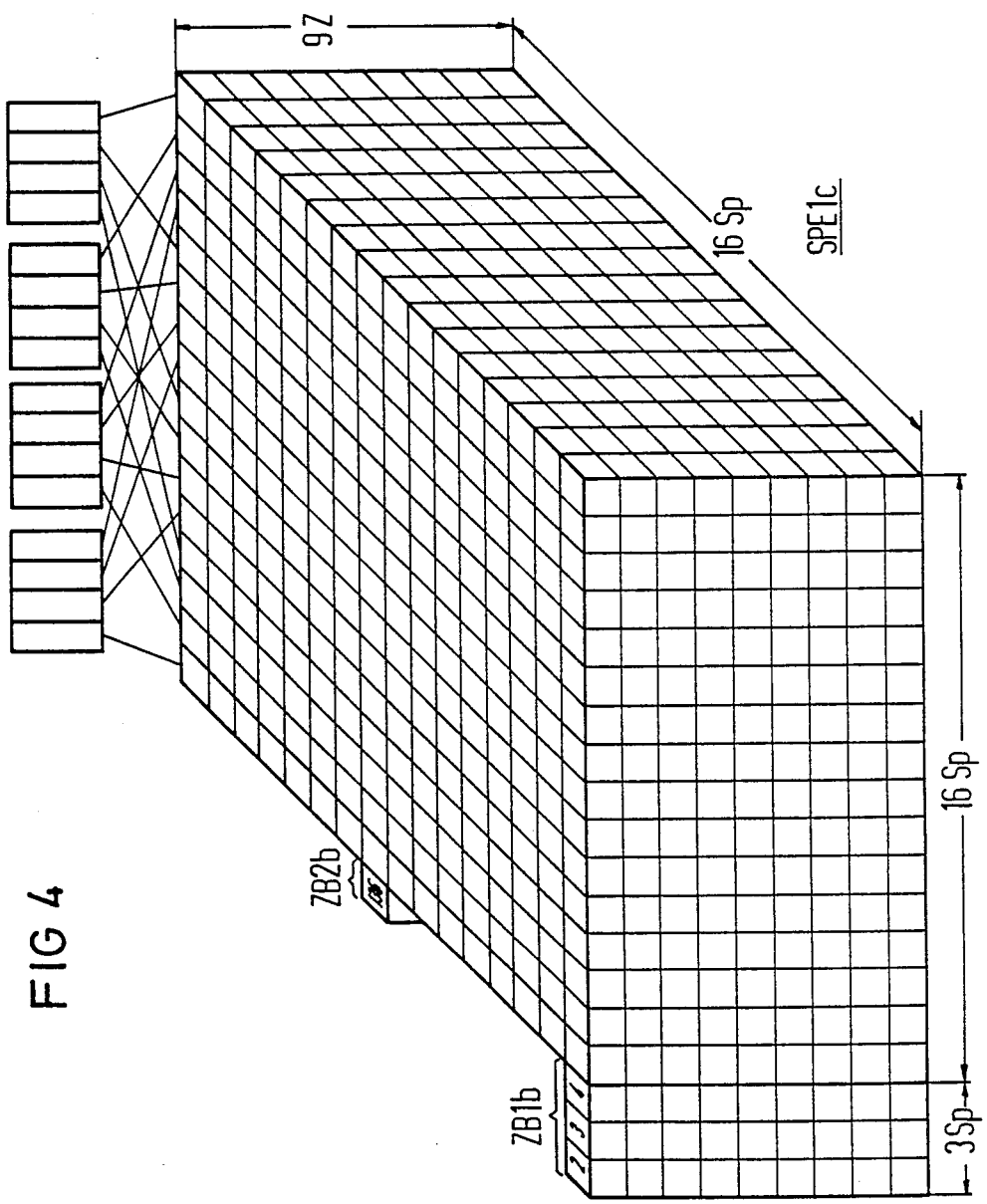
FIG. 4 shows a third variant of this part.

The same is true of the synchronous payload envelope SPE1c according to FIG. 4 that differs from that according to FIG. 3 only in that the first auxiliary block ZB1b only comprises three columns. This is adequate for auxiliary signals. The occupation of the main blocks HB1a–HB16a can be the same as in the synchronous payload envelope SPE1b of FIG. 3.

Figure 5:
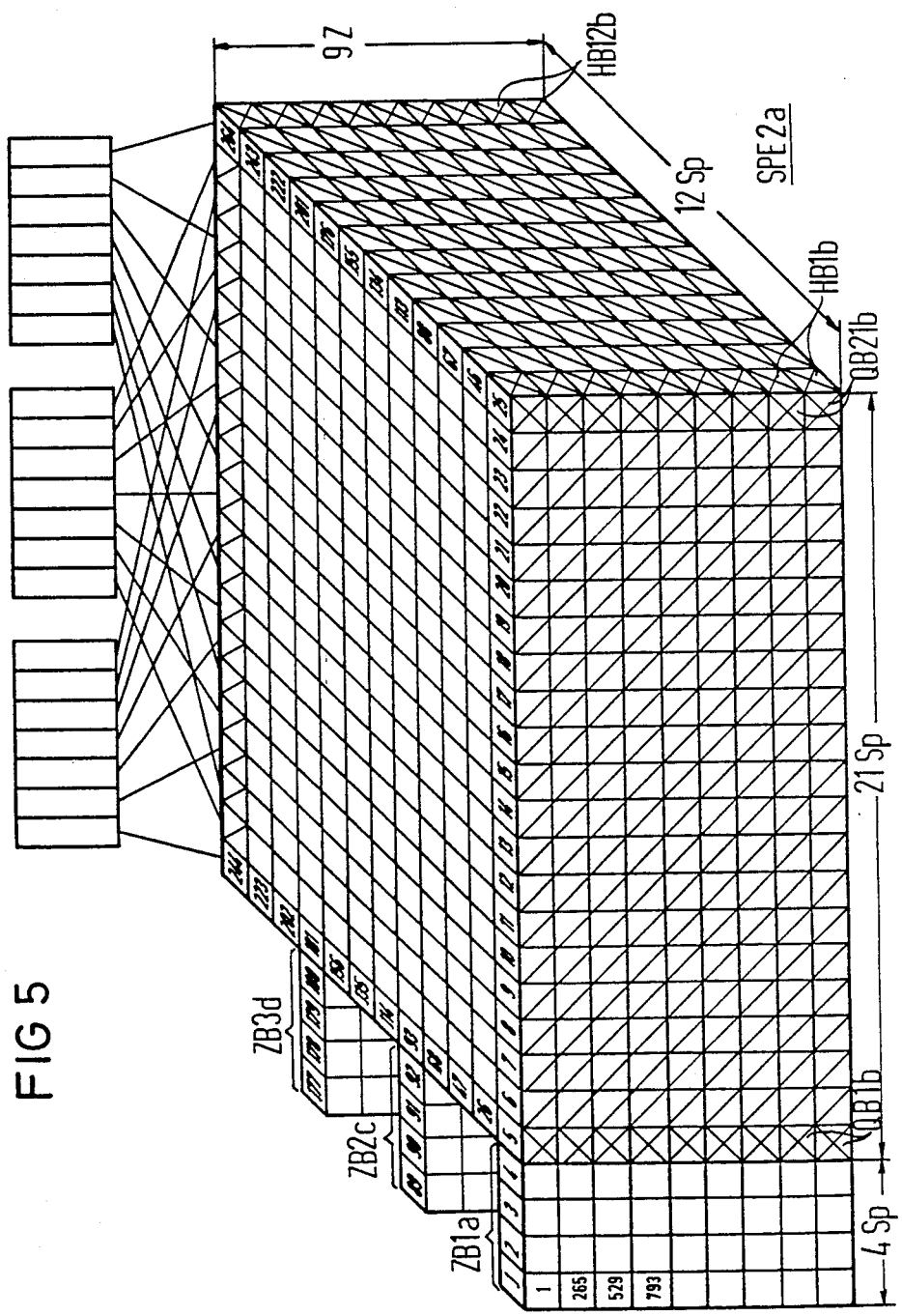
FIG. 5 shows a different envelope-structured part, preferably for 1544 kbit/s signals.

The same plurality of columns SP as in FIG. 1 is arranged in the synchronous payload envelops SPE2a in FIG. 5, but is differently arranged. There are twelve main blocks HB1b–HB12b each of which comprise 21 columns Sp. Three auxiliary blocks ZB1a, ZB2c are also provided.

The three rectangles in the upper part of FIG. 5 symbolically represent 44,736 kbit/s signals that contain seven 6312 kbit/s signals or twenty-eight 1544 kbit/s signals or 2048 kbit/s signals as well and can be converted into one 139,264 kbit/s signal. The lines to the part SPE2a show the transverse blocks from which data for the 44,736 kbit/s signals are taken.

For a formation of three 44,736 kbit/s signals from 1544 kbit/s signals, signals can be taken respectively offset from the columns 5–25, 93–113 and 181–201, from the columns 26–46, 114–134 and 202–222, from the columns 47–67, 135–155 and 223–243 or, respectively, from the columns 68–88, 156–176 and 244–264 of every third transverse block.

2048 kbit/s signals that are not to be transposed can be accommodated in the columns 5–20, 69–84, 137–152 and 201–216, in the columns 21–36, 85–100, 153–168 and 217–232, in the columns 37–52, 101–116, 169–180 and 233–248 or, respectively, in the columns 53–68, 117–132, 185–200 and 249–264. The columns 133–136 are provided for auxiliary signals.

For a formation of three 44,736 kbit/s signals from 2048 kbit/s signals, data can be taken respectively offset from the columns 5–25, 68–88, 135–155 and 202–222, from the columns 26–46, 93–113, 156–176 and 223–243 or, respectively, from the columns 47–67 114–134, 181–201 and 244–264 of every third transverse block.

Either three 2048 kbit/s signals or four 1544 kbit/s signals can be transmitted in the transverse blocks.

Figure 6:
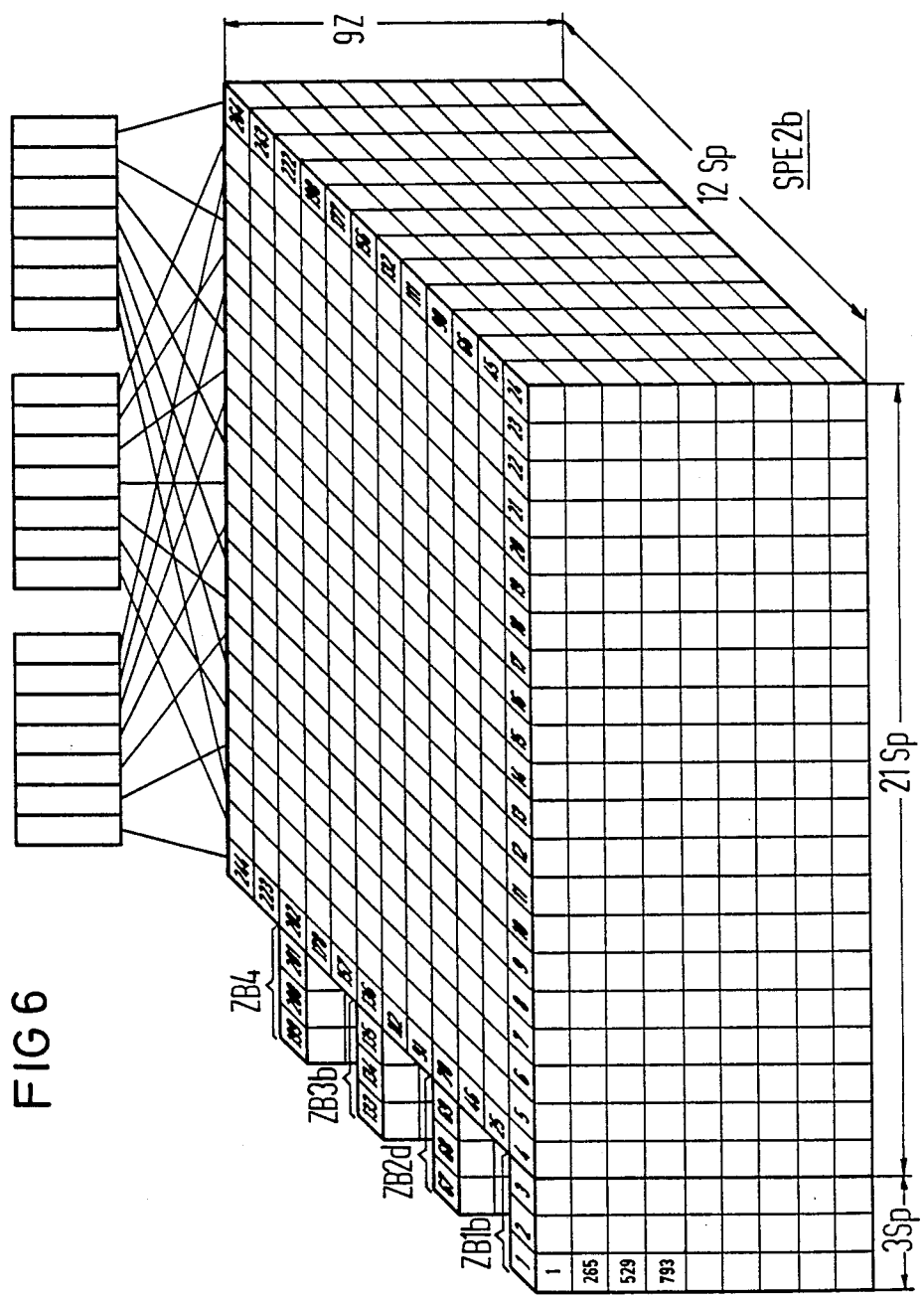
FIG. 6 shows a second variant of this different part.

The synchronous payload envelope SPE2b of FIG. 6 also contains main blocks HB1b–HB12b like FIG. 5. However, four auxiliary blocks ZB1b, ZB2d, ZB3b and ZB4 each having three columns are provided. A different numbering of the columns thereby derives.

For the formation of three 44,736 kbit/s signals from 1544 kbit/s signals, data are taken respectively offset from the columns 4–24, 70–90, 136–156 and 202–222, from the columns 25–45, 91–111, 157–177 and 223–243 and from the columns 46–66, 112–132, 178–198 and 244–264 of every third transverse block.

For grouping three 44,736 kbit/s signals from 2048 kbit/s signals, data are taken respectively offset from the columns 4–24, 91–111 and 178–198, from the columns 25–45, 112–132 and 202–222, from the columns 46–66, 136–156 and 223–243 as well as from the columns 70–90 157–177 and 244–264 of every third transverse block.

The transverse blocks can be occupied either with three 2048 kbit/s signals or with four 1544 kbit/s signals in such a synchronous payload envelope SPE2b.

It will be apparent that various modifications and/or additions may be made in the apparatus of the invention without departing from the essential feature of novelty involved, which are intended to be defined and secured by the appended claims.

What is claimed is:

1. A method of forming a basic pulse transmission frame for a digital signal multiplex hierarchy for a synchronous network comprising the steps of:
   providing a header part for monitoring signals composed of transport overhead data, and
   providing a synchronous payload envelope for useful data and auxiliary signals having 9 rows (Z) each of said rows having multiple columns (SP) with byte or oktette division and
   providing for each of said rows either 16 main blocks (HB1a–HB16a) of 16 columns (Sp) each or 12 main blocks (HB1b–HB12b) of 21 columns (Sp) each and also providing further columns (Sp) for auxiliary blocks (ZB1a, ZB1b, ZB2a, ZB2b, ZB2c, ZB2dZB3a, ZB3b, ZB4) in the synchronous payload envelope (SPE1a, SPE1b, SPE1c, SPE2a, SPE2b).

2. The basic pulse frame method according to claim 1, including the step of, for each row, providing 261 columns (Sp), providing 16 main blocks (HB1a–HB16a) each having 16 columns (Sp), the first main block (HB1a) being preceded by a first auxiliary block (ZB1a) having 4 columns for auxiliary signals; and providing a second auxiliary block (ZB2b) having 1 column for auxiliary or payload signals between the eighth (HB8a) and the ninth (HB9a) main blocks.

3. The basic pulse frame method according to claim 1, including the steps of, for each row, providing 260 columns (Sp), providing 16 main blocks (HB1a–HB16a) each having 16 columns (Sp), the first main block (HB1a) being preceded by a first auxiliary block (ZB1b) having 3 columns for auxiliary signals; and providing a second auxiliary block (ZB2b) having one column for auxiliary and payload signals between the eighth (HB8a) and the ninth (HB9a) main blocks.

4. The basic pulse frame method according to claim 1, including the step of, for each row, providing the main blocks (HB1a–HB16a; HB1b–HB12b) and the auxiliary blocks (ZB1a, ZB2a; ZB1a, ZB2c, ZB3a; ZB1b, ZB2b, ZB3b, ZB4) such that together they cover 264 columns (Sp) in the synchronous payload envelope (SPE1a; SPE2a; SPE2b).

5. The basic pulse frame method according to claim 4, including the step of providing 16 main blocks (HB1a–HB16a), each having sixteen columns (Sp); the first main block (HB1a) being preceded by a first auxiliary block (ZB1a) having four columns (Sp) for auxiliary signals; and providing a second auxiliary block (ZB2a) having four columns (Sp) for auxiliary or payload signals between the eighth (HB8a) and the ninth (HB9a) main blocks.

6. The basic pulse frame method according to claim 2, 3 or 5, including the step of providing four columns (Sp) of the 16 main blocks (HB1a–HB16a) for the acceptance of a 2048 kbit/s signal.

7. The basic pulse frame method according to claim 6, including the steps of providing the (Sp) in four-column auxiliary blocks (ZB1a, ZB2a) which are continuously numbered from 1 at the start to 264 at the end of the basic pulse frame, except in the case of shortened auxiliary blocks (ZB1b, ZB2b) having omitted columns, the numbers of the omitted columns (Sp) are omitted; and taking data respectively offset from the columns 5–20, 69–84, 137–152 and 201–216, from the columns 21–36, 85–100, 153–168 and 217–232, from the columns 37–52, 101–116, 169–184 and 233–248 or, respectively, from the columns 53–68, 117–132, 185–200 and 249–264 of every fourth transverse block for formation of four 34,368 kbit/s signals.

8. The basic pulse frame method according to claim 2, 3 or 5, including the step of providing respectively three columns (Sp) of the 16 main blocks (HB1a–HB16a) and, optionally, of the second auxiliary block (ZB2a, ZB2b), as structure for the acceptance of 1544 kbit/s signals.

9. The basic pulse frame method according to claim 5, including the steps of providing columns (Sp) which are continuously numbered from 1 at the start to 264 at the end of the basic pulse frame; and combining the columns 5–25, 93–113 and 181–201, the columns 26–46, 114–134 and 202–222, the columns 47–67, 135–155 and 223–243 or, respectively, the columns 68–88, 156–176 and 244–264 and providing the columns 1–4, 89–92 and 177–180 for the acceptance of auxiliary signals.

10. The basic pulse frame method according to claim 5, including the step of providing columns (Sp) which are continuously numbered from 1 at the start to 264 at the end of the basic pulse frame; and taking data respectively offset from the columns 5–20, 85–100 and 169–184, from the columns 21–36, 101–116 and 185≧200, from the columns 37–52, 117–132 and 201–216, from the columns 53–68, 137–152 and 217–252 or, respectively, from the columns 69–84, 153–168 and 233–248 of every fourth transverse block for a formation of four 34,368 kbit/s signals; with columns 249–264 provided for auxiliary signals.

11. The basic pulse frame method according to claim 1, including the steps of providing columns that assume the same position (transverse blocks) in all 16 main blocks HB1a–HB16a respectively for four 2048 kbit/s signals or for three 1544 kbit/s signals or for one 8448 kbit/s signal or for one 6312 kbit/s signal; with the columns that remain free in the case of 1544 kbit/s signals or 6312 kbit/s signals provided for accepting auxiliary signals.

12. The basic pulse frame method according to claim 4, including the steps of providing the 12 main blocks (HB1b–HB12b) with 21 columns (Sp); the first main block (HB1b) being preceded by a first auxiliary block (ZB1a) having four columns for optional occupation with auxiliary signals; providing a second auxiliary block (ZB2b) between the fourth (HB4b) and the fifth (HB5b) main blocks and providing a third auxiliary block (ZB3) between the eighth (HB8b) and the ninth (HB9b) main blocks, and providing each of said second and third auxiliary blocks with four columns for auxiliary or payload signals.

13. The basic pulse frame method according to claim 12, including the step of providing three columns (Sp) of the 12 main blocks (HB1b–HB12b) as structure for an acceptance of 1544 kbit/s signals.

14. The basic pulse frame method according to claim 13, including the step of providing numbered columns which are continuously numbered from 1 at the start to 264 at the end of the basic pulse frame; taking data which are respectively offset from the columns 5–25, 93–113 and 181–201, from the columns 26–46, 114–134 and 202–222, from the columns 47–67, 135–155 and 223–243 or, respectively, from the columns 68–88, 156–176 and 244–264 of every third transverse block, for a formation of three 44,736 kbit/s signals.

15. The basic pulse frame method according to claim 12, including the step of providing respectively four columns (Sp) of the 12 main blocks (HB1b–HB12b), of the second auxiliary block (ZB2c) and of the third auxiliary block (ZB3), as structure for the acceptance of 204 kbit/s signals.

16. The basic pulse frame method according to claim 15, including the steps of providing numbered columns which are continuously numbered from 1 at the start to 264 at the end of the basic pulse frame; and combining the columns 5-20, 69-84, 137-152 and 201-216, the columns 21-36, 85-100, 153-168 and 217-232, the columns 37-52, 101-116, 169-180, and 233-248 or, respectively, the columns 53-68, 117-132, 185-200 and 249-264; providing columns 133-136 for auxiliary signals.

17. The basic pulse frame method according to claim 12, including the step of providing respectively four columns of the 12 main blocks (HB1b-HB12b) as structure for the acceptance of 2048 kbit/s signals.

18. The basic pulse frame method according to claim 17, including the steps of providing numbered columns which are continuously numbered from 1 at the start to 264 at the end of the basic pulse frame: and taking data which are respectively offset from the columns 5-25, 68-88, 135-155 and 202-222, from the columns 26-46, 93-113, 156-176 and 223-243 or, respectively, from the columns 47-67, 114-134, 181-201 and 244-264 of every third transverse block for formation of three 44,736 kbit/s signals.

19. The basic pulse frame method according to claim 4, including the steps of providing 12 main blocks (HB1b-HB12b) each having 21 columns (Sp); the first main block (HB1b) being preceded by a first auxiliary block (ZB1b) having 3 columns for auxiliary signals; and providing a second auxiliary block (ZB2d) having three columns (Sp) between the third (HB3b) and the fourth (HB4b) main blocks, a third auxiliary block (ZB3b) having three columns (Sp) between the sixth (HB6b) and the seventh (HB7b) main blocks and a fourth auxiliary block (ZB4) having three columns (Sp) between the ninth (HB9b) and the tenth (HB10b) main blocks, respectively, for auxiliary or payload signals.

20. The basic pulse frame method according to claim 19, including the step of providing respectively 3 columns (Sp) of the 12 main blocks (HB1b-HB12b) as structure for an acceptance of 1544 kbit/s signals.

21. The basic pulse frame method according to claim 20, including the step of providing numbered columns which are continuously numbered from 1 at the start to 264 at the end of the basic pulse frame; and taking data which are respectively offset from the columns 4-24, 70-90, 136-156 and 202-222, from the columns 25-45, 91-111, 157-177 and 223-243 or from the columns 46-66, 112-132, 178-198 and 244-264 of every third transverse block, for a formation of three 44,736 kbit/s signals.

22. The basic pulse frame method according to claim 19, including the step of providing respectively 4 columns (Sp) of the 12 main blocks (HB1b through HB12b) as structure for accepting 2048 kbit/s signals.

23. The basic pulse frame method according to claim 22, including the step of providing numbered columns which are continuously numbered from 1 at the start to 264 at the end of the basis pulse frame; and taking data respectively offset from the columns 4-24, 91-111 and 178-198, from the columns 25-45, 112-132 and 202-222, from the columns 46-66, 136-156 and 223-243 or, respectively, from the columns 70-90, 157-177 and 244-264 of every third transverse block, for a formation of three 44,736 kbit/s signals.

24. The basic pulse frame method according to claim 1, including the step of providing the columns that occupy the same position (transverse blocks) in all 12 main blocks (HB1b-HB12b), respectively, for three 2048 kbit/s signals or for four 1544 kbit/s signals.

* * * * *